United States Patent Office 3,532,486
Patented Oct. 6, 1970

3,532,486
CONSOLIDATION AND GRANULATION OF
OIL-CONTAINING SOLID FINES
William E. Savage, Castro Valley, Calif., assignor to
Shell Oil Company, New York, N.Y., a corporation of
Delaware
No Drawing. Filed Nov. 13, 1967, Ser. No. 682,575
Int. Cl. G05d 1/00
U.S. Cl. 71—61
4 Claims

ABSTRACT OF THE DISCLOSURE

An improved method for compacting and subsequently granulating liquid hydrocarbon-containing water-soluble solid particle fines by admixing with such contaminated fines a small amount of liquid hydrocarbon free pure water-soluble fines of the same material and thereafter compacting and granulating the fine mixture.

---

The present invention relates to a new, novel and improved process for compacting and granulating liquid hydrocarbon-containing water-soluble solid lines, e.g., fertilizer fines, which are readily compacted and granulated for easier handling and are attrition resistant.

BACKGROUND OF THE INVENTION

It is well known in the art that a desirable method of transporting water-soluble solids such as solid fertilizers, e.g., potash, phosphates, etc., is to form slurries of said solids in a liquid carrier and thereafter recovering the solid material from the liquid at a terminal end. In forming the slurry, the solids are generally in very fine particle form (fines) which on recovery from a liquid carrier are difficult to handle and are not suitable for commercial use, resulting in economic losses. Normally, solid fines are granulated by first compacting or densifying them and thereafter granulating the compacted or densified fines into granules of desired dimension.

Although water-soluble solid particle fines such as alkali metal salts, e.g., potash, can be compacted and granulated by suitable means such as mentioned, such materials which for some reason contain hydrocarbons such as petroleum oils become resistant to compaction and granulation by the above or any other known methods. Thus, water-soluble fines such as alkali metal salts or various other alkali compounds, e.g., potassium chloride, potash, potash salts, sodium chloride, muriate of potash (sylvite), soda ash, sodium sulfate, diammonium phosphate, phosphate rock and the like, as well as various fertilizer materials which contain even less than a friction of one percent of a liquid hydrocarbon which may be crude oil or fractions thereof are resistant to compaction and subsequent granulation necessary to meet standard commercial granulation requirement to meet market standards. Solid particle fines which would normally contain liquid hydrocarbons are discussed in U.S. patent application Ser. No. 366,870, filed May 12, 1964, now Pat. No. 3,365,279 which relates to a method of recovering solid fertilizer particles from oil slurries by means of aqueous phase transfer. Although the separation process described in this application is extremely effective in recovering solid particles essentially free of liquid hydrocarbons, nevertheless it has been found that even such small amounts of less than 0.01% of oil or fractions thereof present in such oil recovered solid particle fines or when present as impurities or as contaminants, prevent granulation of the fines.

Conventional marketed potash, e.g., sylvite (KCl), is generally reconstituted by compaction followed by granulation. Sylvite has a density of 124.5 lb./cu. ft., and when KCl fines are compacted, the flakes tinkle like glass when rattled together. Particles of non-compacted sylvite have a hardness of 11 pounds or more.

Sylvite containing 0.3 and 1% oil cannot be compacted into a crystalline form by normal means known to the art. At best, it will form flat flakes resembling crumbled mica. Sylvite in that form is not acceptable in the fertilizer trade.

By solid particle fines is meant solid particle fines having generally dimensions of less than 60 mesh to less than 400 mesh and granular particles are within the meaning of the term used in the art as, for example, in the fertilizer industry and as defined above.

It is an object of the present invention to compact and granulate water-soluble solid particle fines containing entrained liquid hydrocarbon.

Still another object of the present invention is to compact and granulate oil-containing water-soluble solid particle fines.

Still another object of the present invention is to compact and granulate oil-containing water-soluble solid fertilizer fines.

Still another object of the present invention is to compact and granulate potash fines containing small amounts of petroleum oil into compact sheets which granulate and which granules are resistant to attrition.

These and other objects will be apparent from the following description of the invention.

SUMMARY OF THE INVENTION

It has now been discovered that liquid hydrocarbon containing water-soluble solid particle fines can be compacted into sheets and the sheets granulated by admixing such fines with hydrocarbon-free fines, the two products being of similar chemical nature. The amount of hydrocarbon-free fines added and the hydrocarbon-containing fines can vary from about 0.1% by weight or higher based on the total solid mixture. Thus, it has been found that oil-containing potash can be compacted by admixing said oil-containing potash with fresh, oil-free potash in amounts of from 0.1 to 90%, respectively.

The present invention is therefore directed to an improved, novel and new technique for compacting and granulating liquid hydrocarbon-containing water-soluble solid particle fines comprising the following steps:

(1) The liquid hydrocarbon-containing water-soluble solid particle fines are admixed with from about 0.1% to about 90% of fresh, oil-free water-soluble particle fines of the same chemical nature;

(2) The mixture of oil-free and oil-containing particle fines are then compacted or densified preferably into thin sheets having a thickness of from about 0.05 to 0.5 inch; and (3) The compacted or densified sheet then can be flaked and granulated or directly granulated into desired granular particle sizes.

If the liquid hydrocarbon content of the solid particle fines is above 1% or higher, it is preferable that prior to subjecting the fines to step (1), namely adding free, clean, oil-free fines to form a fine mixture, to heat-treat the oil-containing fines by suitable means, e.g., vacuum or kiln drying, at temperatures which may range from about 200° F. to above 1000° F. so as to vaporize off the hydrocarbon and reduce its content to less than 1% and preferably to less than 0.3% by weight and then adding fresh oil-free fines so as to form a desired mixture of fines suitable for compaction and granulation.

All of the process steps essential to the present invention preferably should be carried out at about ambient temperature and preferably in a continuous and uninterrupted manner.

A method for compacting and granulating solid fines such as potash particle fines which may contain from 0.1% to 1% oil by the process of this invention is to heat the fines to an elevated temperature of as high as 950° F. to reduce the oil content to less than 0.3% and preferably to less than 0.05%. The fines are then admixed with fresh, oil-free fines at ambient temperature, the fine mixture compacted into thin sheets of less than 0.25 inch thick and thereafter flaked and/or granulated into desired granular particle sizes. Without rendering the oil-containing particle fines to step (1) of the present invention, namely mixing the oil-containing fines with oil-free fines such oil-containing fines such as oil-containing potash, e.g., oil-containing sylvite, cannot be compacted and granulated satisfactorily to a salable product. Thus, step (1) can be regarded as the essential step in the process of compacting and granulating fine mixtures by the process of the present invention. Also, the temperature conditions and the continuous order of steps as outlined above are essential to achieving a successful granulaion process in accordance with the teaching of the present invention.

PREFERRED EMBODIMENT OF THE INVENTION

A method to reconstitute oil-containing potash fines, e.g., oil-containing sylvite fines, recovered from a crude oil slurry such as would be used for pipeline transportation of sylvite involved adding to the oil-containing sylvite about 10–60% of fresh, clean, oil-free sylvite before the usual roll compaction and granulation steps. The oil-containing fines should preferably contain less than 0.1% oil, a level which can be readily achieved through the improved phase separation step described in U.S. application Ser. No. 654,416, filed July 19, 1967, now Pat. No. 3,478,857, combined if necessary with drying in a rotary kiln or other suitable apparatus.

Fines containing 1% oil may be mixed with oil-free fines and compacted and granulated but fines containing less than 0.1% oil when admixed with oil-free fines compact readily and yield exceptionally strong granules on granulation. Without adding fresh oil-free potash it is impossible to compact satisfactorily to a salable product oil-containing potash, e.g., oil-containing sylvite, or other oil-containing fertilizer fines recovered from oil slurry to achieve acceptable particle geometries and acceptable recycle rates using ordinary compacting procedures.

As mentioned above it has been found that oil-containing fines which are uncompactable can be made compactable by admixing therewith a small amount of fresh oil-free fines of a similar chemical nature.

Compaction of the mixture can be accomplished by passing the mixture of oil-containing sylvite and oil-free sylvite through a smooth roll compactor. The nature of compactable crystalline materials results in mergence of the individual particles into a ocntinuous sheetlike crystal under the extreme pressures of the compactor.

Fines (oil-containing and/or oil-free) not compacted fall through the flake breaker unchanged and can be returned to the compactor for further processing. The fines produced in breaking the compactor sheet can be mixed with these fines and returned to the compactor.

The flaked material can be put through a suitable granulator, e.g., a two-deck granulator, with, for example, granulator rolls, in which one roll of each pair has longitudinal grooves and the other has circumferential grooves. Such rolls can produce −6 to +14 mesh granules (Tyler). Product from these rolls can be adjusted to produce 30% +6 mesh, 65% −6 to +30 mesh and 5% −30 mesh.

The +6 oversize granules can be passed through rolls giving about 10% +6, 85% −6 to +30 and 5% −30.

The granulated product can be screened to remove granulator fines which can be sent to the compactor. In the complete scheme, granulator fines and compactor fines are combined and recycled to the compactor.

To illustrate the effectiveness of the process of the present invention with respect to compaction of a mixture of 99% of oil-containing sylvite containing 0.3% and 1% oil (A and B) respectively, were each admixed with 1% of oil-free sylvite fines and on compaction the density was around 120 lbs./ft.$^3$ and the hardness of the compacted mixture was around 14 pounds expressed as the average force required to crush +10 mesh particles whereas oil-free sylvite on compaction has a density of around 123 lbs./ft.$^3$ and a hardness of 9 pounds.

Thus, by the process of this invention, fines, e.g., sylvite fines, recovered from a crude oil slurry can be compacted and reconstituted to fertilizer grade granules (−6 to +30 mesh) preferably when the residual oil content is less than 0.1%, if the fines are admixed with a small amount of oil-free sylvite fines. Although fines containing 1% oil can be compacted by forming mixtures of this invention, the granules are of marginal strength and therefore it is desirable that the oil content does not exceed about 0.1%.

The foregoing description of the invention is merely intended to be explanatory thereof. Various changes in the details of the method may be made, within the scope of the appended claims, without departing from the spirit of the invention.

I claim as my invention:

1. In a process for compacting and granulating water-soluble solid fertilizer salt particle fines which are resistant to compacting and granulation, the steps comprising:
   (a) forming a mixture of liquid hydrocarbon containing fertilizer fines and liquid hydrocarbon-free of similar water-soluble fertilizer salt solid particle fines said liquid hydrocarbon containing fertilizer fines containing less than 1% of oil;
   (b) compacting the fine mixture;
   (c) flaking the compacted fine mixture; and
   (d) granulating the flakes.

2. The process of claim 1 wherein the liquid hydrocarbon containing fines are water-soluble solid fertilizer fines and are selected from the group consisting of potash, sylvite, phosphates, sodium chloride and sodium sulfate.

3. The process of claim 2 wherein the oil-containing fines and oil-free fines are potash fines having particle size of from less than 60 mesh to greater than 400 mesh and the compacting and granulation process is carried out at ambient temperature.

4. The process of claim 3 wherein the fine mixture is a sylvite mixture in which the oil-containing sylvite has a crude oil content of less than 0.1%.

References Cited

UNITED STATES PATENTS 2,935,387   5/1960   Phillips.

REUBEN FRIEDMAN, Primary Examiner

R. N. BARNES, Assistant Examiner

U.S. Cl. X.R.

71—63, 64